Figure 1:
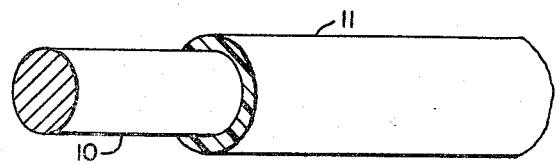

May 23, 1967  F. A. SATTLER  3,321,548
AMINE-MODIFIED EPOXY RESIN BLENDED WITH
A BLOCKED POLYISOCYANATE
Filed Dec. 31, 1962

WITNESSES:
Bernard R. Gieguay
James F. Young

INVENTOR
Frank A. Sattler

BY
A. L. Towle
ATTORNEY

United States Patent Office 3,321,548
Patented May 23, 1967

3,321,548
AMINE-MODIFIED EPOXY RESIN BLENDED WITH A BLOCKED POLYISOCYANATE
Frank A. Sattler, Monroeville, Pa., assignor to Westinghouse Electric Corporation, Pittsburgh, Pa., a corporation of Pennsylvania
Filed Dec. 31, 1962, Ser. No. 248,713
18 Claims. (Cl. 260—829)

This invention relates to electrical insulation and has particular reference to blends of amine modified epoxy resins and polyisocyanate resins. This invention also relates to coating compositions containing such resinous blends and to electrical members coated therewith.

Enamel coatings on electrical conductors, as for example the coatings on magnet wire, are subjected to rigorous mechanical and environmental conditions. The coating must have very high physical, chemical and electrical properties.

Coils are often wound from enameled wire on automatic winding equipment which subjects the wire to considerable pressure at high speeds. The coating must withstand the abrasion, bending stresses, elongation and heavy unit pressures without disrupting or cracking.

Since electrical coils are frequently varnish impregnated, the wire coatings must be resistant to hot varnishes and solvents and must withstand high baking temperatures without deteriorating. Electrical equipment and the coils employed therein are frequently exposed to the action of oils, greases, dust and water in typical industrial environments. Over prolonged periods of time, high humidity conditions will cause coatings with poor hydrolytic stability to deteriorate and fail in service.

Resin compositions suitable for providing insulating coatings on wires must also be capable of being dissolved in commercially available solvents to produce solutions having a relatively high solids content without excessive viscosity. When applied to wire or other conductors, the resinous composition must be capable of being satisfactorily cured within a reasonably wide range of temperatures.

The sophisticated materials systems employed in new scientific areas have emphasized old requirements and imposed new demands on electrical insulation. In providing insulating coatings on superconducting alloy wires, for example niobium-zirconium alloys, all of the foregoing conditions must be met by resinous materials which will cure at relatively low temperatures. Fast curing compositions should be employed when meta-stable alloy wires are being insulated to insure the retention of superconducting properties.

Some specific environmental conditions, to which insulated wires are exposed, include refrigerants, as for example, monochlorodifluoromethane. Motors with windings exposed to polyhalogenated alkane refrigerants in industrial and commercial low-temperature cooling systems must have insulation which will not degrade even after prolonged service.

In some applications, it is also desirable to employ wire insulating coatings which will flow off cleanly when immersed in liquid solder. The advantages of such solderable wire coatings include the elimination of the prior separate step of stripping the insulation either mechanically or chemically.

Furthermore, the applied cured coating of resinous insulation should be smooth and free from pinholes or other flaws. A thin coating of the cured resinous insulation should possess a high dielectric strength and have other desirable electrical insulating properties.

Detailed tests have been developed for enameled or resin insulated wires to determine their properties and suitability for various applications. These test results also provide a comparison of the relative qualities of wires insulated with different enamels or resins. Among the properties which those skilled in the art recognize as being significant are flexibility, cut-through temperature, abrasion resistance, thermal life or stability, elongation and heat shock.

Accordingly, it is a general object of this invention to provide novel blended resinous coating compositions which may be applied to electrical conductors and cured thereon employing rapid bake cycles to produce coatings with excellent flexibility, high-temperature cut-through properties and resistance to polyhalogenated alkane refrigerants.

A more specific object of this invention is to provide resinous coating compositions which are blends of amine and/or alkanol amine modified epoxy resins with polyisocyanate resins, which are especially suitable for insulating electrical conductors.

Another object of this invention is to provide an insulated conductor comprising, in combination, an electrical conductor with solid resinous insulation applied thereto, the resinous insulation having superior hydrolytic stability and resistance to polyhalogenated alkane refrigerants.

Yet another object of the present invention is to provide compositions which are blends of amines and/or alkanol amine modified epoxy resins with polyisocyanate resins which may be further blended with urea-formaldehyde resins, polyurethane resins, phenol-modified coumaroneindene resins and aromatic dicarboxylic polyester and polyesteramide resins to further improve certain properties of insulating coatings produced therefrom.

Other objects of this invention will, in part, be obvious, and will, in part, appear hereinafter.

Briefly, the present invention accomplishes the above cited objects by providing novel wire enamel compositions prepared from epoxy or aromatic base diglycidyl polyethers reacted with aromatic polyamines or aliphatic amine-alcohols and blended with polyisocyanate resins. Other compositions may be prepared by adding polymers to the described two-component blend with certain attendant advantages. Certain amounts of aromatic dicarboxylic polyester and/or polyesteramide resins, ureaformaldehyde resins, polyurethane resins and phenolmodified coumarone-indene resins are added to the two-component blend.

Figure 2:
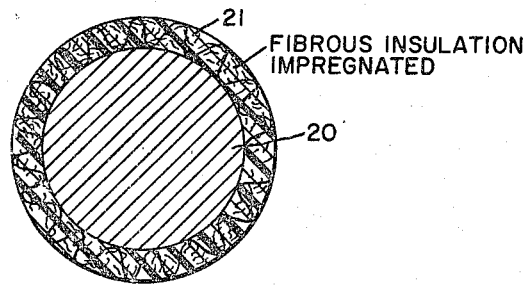

For a more complete understanding of the present invention, reference is made to the following description taken in conjunction with the accompanying drawing, in which:

FIGURE 1 is a fragmentary isometric view of a conductor provided with a resinous insulating coating of this invention; and FIG. 2 is a cross-sectional view of a conductor insulated with a fibrous material and a resinous insulating coating of this invention.

It has now been discovered that blends of certain resinous coating compositions may be employed to provide insulating coatings having satisfactory electrical and physical properties, exceptional hydrolytic stability and resistance to polyhalogenated alkane refrigerants. Moreover, the coatings may be cured in fast cycles where only low temperatures are permissible in order to maintain the properties of the electrical conductor.

Insulating coating compositions prepared from aromatic base diglycidyl ether resins modified with ureaformaldehyde resins have been extensively employed as wire insulation because the insulation coating produced therefrom has excellent moisture resistance, good flexibility and stability in oil-filled transformer systems. Reference is made to U.S. Patent 2,911,326, assigned to the assignee of this invention, as an example of such compositions and coatings.

Coating compositions comprising a modified epoxy resin derived from the reaction of aromatic diamines and/or aliphatic alcohol-amines with aromatic base diglycidyl ethers in the proportions of about one-half to two epoxy groups per amino group blended with blocked polyisocyanates have markedly improved properties as compared to urea-formaldehyde modified epoxy coating compositions. Surprisingly significant improvements are noted in cut-through temperatures, abrasion resistance, solderability, hydrolytic stability and resistance to softening by polyhalogenated alkane refrigerants, as for example monochlorodifluoromethane, available commercially under the proprietary name "Freon 22." Moreover, as noted above, these novel compositions may be cured by employing fast bake cycles, as for example, up to 50 feet per minute in a tower at 430° C.

The basic two-component blended composition of this invention comprises from about 40 to 90%, by weight of the described amine-modified epoxy resin with about 10 to 60%, by weight, of a blocked isocyanate resin, on a solids basis. It will be apparent to those skilled in the art that solvents are employed to provide a solution of the resin blend having a satisfactory coating viscosity.

Epoxy resins, or aromatic base diglycidyl ethers suitable for use in this invention include the diglycidyl ether of bis-phenol "A" and the diglycidyl ether of resorcinol, for example, The epoxy equivalent of suitable resinous materials can be from about 400 to about 4000.

The resinous aromatic base epoxy compositions which are employable in this invention may be prepared, in accordance with one preferred procedure, by reacting predetermined amounts of at least one polyhydric phenol or polyhydric alcohol and at least one epihalohydrin in an alkaline medium. Phenols, suitable for use in preparing such resinous polymeric epoxides, include those which contain at least two phenolic hydroxyl groups per molecule. Polynuclear phenols which have been found to be particularly suitable include those wherein the phenol nuclei are joined by carbon bridges, such for example as 4,4'-dihydroxydiphenyldimethyl-methane (referred to hereinafter as bis-phenol "A"), and 4,4'-dihydroxy-diphenylmethane.

While it is preferred to use epichlorohydrin as the epihalohydrin in the preparation of the resinous polymeric epoxide of the present invention, homologs thereof, for example, epibromohydrin and the like also may be used advantageously.

In the preparation of the resinous aromatic base polymeric epoxides, aqueous alkali is employed to combine with the halogen of the epichlorohydrin reactants. The amount of alkali employed should be substantially equivalent to the amount of halogen present and preferably should be employed in an amount somewhat in excess thereof. Aqueous mixtures of alkali metal hydroxides, such as potassium hydroxides and lithium hydroxides, may be employed although it is preferred to use sodium hydroxide since it is relatively inexpensive.

The product of the reaction, instead of being a single simple compound, is generally a complex mixture of glycidyl polyether, but the principal product may be represented by the formula:

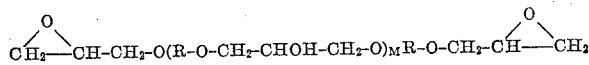

wherein M is an integer of the series 0, 1, 2, 3 and R represents the divalent aromatic hydrocarbon radical of the dihydric phenol. While for any single molecule of the polyether, M is an integer, the fact that the obtained polyether is a mixture of compounds causes the determined value for M, from molecular weight measurement to be an average which is not necessarily zero or a whole number. Although the polyether is a substance primarily of the above formula, it may contain some material with one or both of the terminal glycidyl radicals in hydrated form.

The simpliest polyester is a diglycidyl diether of the dihydric phenol which contains a single divalent aromatic hydrocarbon radical from the dihydric phenol and has two glycidyl radicals linked thereto by ethereal oxygen atoms. More generally, the polyether is of more complex character and contains two or more aromatic hydrocarbon radicals alternating with glyceryl groups in a chain which are linked together by intervening ethereal oxygen atoms.

The resinous polymeric epoxide, or glycidyl polyether of a dihydric phenol has an average number of epoxide groups greater than 1.0 in the average molecule of the glycidyl ether. Owing to the method of preparation of the glycidyl polyethers and the fact that they are ordinarily a mixture of chemical compounds having somewhat different molecular weights and contain some compounds wherein the terminal glycidyl radicals are in hydrated form, the average number of epoxide groups in the average molecule of the product is not necessarily the integer 2.0. However, in all cases, it is a value greater than 1.0. It is thus a value between 1.0 and 2.0. The epoxide or epoxy equivalent is determined by dividing the average molecular weight by the average number of epoxide groups in the average molecule.

The number of epoxide groups in the glycidyl polyether is determined by heating a weighted sample of the ether with an excess of 0.2 N pyridinium chloride in chloroform solution at the boiling point under reflux for two hours whereby the pyridinium chloride hydrochlorinates the epoxy groups to the chlorohydrin groups. After cooling, the excess pyridinium chloride is back-titrated with 0.1 N sodium hydroxide in methanol to the phenolphthalein and point.

The modified epoxy component of the described blend may be prepared by reacting the epoxy resin with aromatic diamines, as for example, m-phenylenediamine, p-phenylenediamine, methylenedianiline, xylylene diamine and diamine pyridine. Alkyl amino alcohols may constitute all or part of the material reacted with the epoxy resin. For example, monoethanolamine, 2-aminoisopropyl alcohol, 2-aminobutanol-1 and 2-amino-2-methylpropanol-1 may be employed in the reaction with the epoxy resin in the described proportions of from about one-half to two epoxy groups per amino group.

The polyisocyanate component of the described blend must be a blocked polyisocyanate. Suitable blocked polyisocyanates have the general formula:

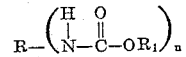

wherein R is a polyvalent organic radical, n is an integer of 3 or more and $R_1$ is a phenyl group or a derivate thereof containing methyl substituents. The blocked polyisocyanates may be prepared by methods known in the art, for example by reacting polyhydric compounds having at least 3 hydroxyl groups with diisocyanates in ratios wherein the diisocyanate and hydroxyl groups are equal. Compounds containing 3 or more isocyanate groups may be reacted with phenol derivatives. Examples of materials available by proprietary names include those of Mobay Chemical Company known as Mondur SH, having the formula:

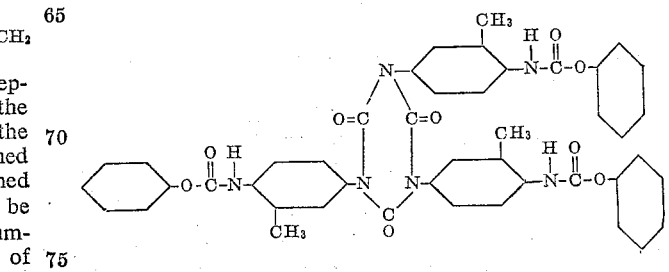

and Mondur S, having the formula:

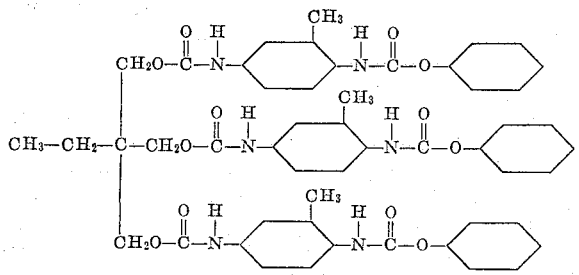

Other resinous polymers may be blended with the heretofore described two-component blend to attain further specific property advantages. Up to about 65%, on a solids weight basis, of terephthalate or isophthalate polyester resins may be employed with at least about 35% of the described two-component blend to improve thermal stability of the coatings produced therefrom. These polyester compositions, coatings and their preparation are known in the art and are not detailed herein. Reference is made to U.S. Patent 2,936,296 for specific details.

Up to about 65% on a solids weight basis of a polyesteramide resin prepared from:

(a) From 40 to 46 equivalent percent of at least one acidic compound selected from the group consisting of isophthalic acid and the lower dialkyl esters of isophthalic and terephthalic acids; lower dialkyl esters will be understood to include all dialkyls such as dimethyl, diethyl, dipropyl, dibutyl and mixtures thereof.

(b) From 13 to 59 equivalent percent of at least one alcohol having three or more hydroxyl groups; examples thereof are glycerol, trimethylolethane, trimethylolpropane and pentaerythritol, (c) Up to 43 equivalent percent of at least one dihydric alcohol; examples thereof are ethylene glycol, 1,4-butanediol, neopentyl glycol, 1,5-pentanediol, 1,6-cyclohexanedimethanol, 2,2,4,4-tetramethyl - 1,3 - cyclobutanediol and propylene glycol, (d) From 0.85 to 19 equivalent percent of at least one compound selected from the group consisting of urea and aliphatic and aromatic primary and secondary diamines; examples of suitable diamines are ethylenediamine, m-phenylenediamine, methylenedianiline, m-xylylenediamine, piperazine and hexamethylenediamine, may be employed with at least about 35% of the desired two-component amine-epoxy plus isocyanate blend to improve both thermal stability and heat shock.

The term "equivalent percent" as employed hereinabove is calculated according to the following formula:

$$\text{Equivalent percent of ingredient} = \frac{\text{No. of moles of ingredient} \times \text{Functionality of ingredient}}{\Sigma(\text{No. of moles of ingredient} \times \text{Functionality of ingredient})} \times 100$$

It should be understood that the functional groups in the foregoing reactants are the carboxyl, hydroxyl and amino groups. Therefore, the dicarboxylic acidic compounds, the dihydric alcohol, the urea or the diamine will be bifunctional while the functionality of the alcohol having three or more hydroxyl groups will be equal to the particular number of hydroxyl groups in that compound. Only the reactants (a), (b), (c) and (d) outlined hereinabove are employed in determining the equivalent percentages and the denominator in the formula is the sum of the number of moles multiplied by the functionality for these reactants. Reference may be had to U.S. application Ser. No. 227,490 filed Oct. 1, 1962, assigned to the assignee of this invention for details on the preparation of suitable polyesteramides.

Up to about 30% of a butylated urea-formaldehyde resin, on a solids weight basis, may be employed with at least about 70% of the described two-component blend to improve heat shock and increase the resistance to softening by polyhalogenated alkane refrigerants.

Up to about 40%, on a solids weight basis, of a phenol-modified coumarone-indene resin may be blended with about 60% of the described two-component blend to increase the resistance to softening by polyhalogenated alkane refrigerants. Various known procedures are available for the production of phenol-modified coumarone-indene resins. Reference is made to German Patent No. 302,543 and U.S. Patent 2,077,099, for example, for a specific description of methods which may be employed.

Up to about 35%, on a solids weight basis, of a polyurethane resin may be blended with about 65% of the described two-component blend to increase the abrasion resistance and the resistance to softening by polyhalogenated alkane refrigerants.

Polyurethanes suitable for use in accordance with this invention are derived from the reaction of an organic diisocyanate with a diol having at least four carbon atoms separating the two reactive hydroxyl groups in a medium containing a phenolic compound which acts as a moderator to limit the polymerization so that a soluble polyurethane is produced. Examples of suitable diisocyanates include 2,4-tolylene diisocyanate, 2,6-tolylene diisocyante, dianisidine diisocyanate, methylene bis(p-phenylene isocyanate), and 3,3' bitolylene, 4,4' diisocyanate. Examples of suitable diols include 1,4-butanediol, 1,6-hexanediol and 1,5-pentanediol.

Aromatic dihydroxy materials may be substituted for the described alkyl diols, either wholly or in part. Examples of suitable aromatic compounds include 4,4'-dihydroxy-diphenyl-dimethyl-methane (also known as bisphenol "A") and 4,4'-dihydroxyethyl-diphenyl-dimethyl-methane (also known as bis-glycol). It is to be understood that mixtures of the organic diisocyanates may be reacted with mixtures of the diols and mixtures of the aromatic dihydroxy components. Although it is preferable to employ stoichiometric quantities of reactants, up to a 20% excess of either the diisocyanate or dihydroxy may be employed.

As will be apparent from the specific examples presented hereinafter, the preparation of the modified epoxy component is carried out in a "Cellosolve" acetate solvent medium. "Cellosolve" is a proprietary name for ethylene glycol monoethyl ether. Dilution of the blended coating composition, which would include the modified epoxy as a component, can be done with a solvent of cresol or cresylic acid and an aromatic hydrocarbon having a boiling range of 135° C. or greater, as for example, xylene.

Although the resinous polymeric blend described heretofore has been limited to two and three-component systems, it is to be understood that blends employing all of the described polymers are suitable compositions so long as at least about 35%, on a solids weight basis, of the described basic two-component blend is employed. The addition of each of the other described polymers should not exceed the solids weight for that polymer as described in the individual three-component blend.

The resinous coating compositions disclosed herein may be applied to electrical conductors composed of metals such as copper, silver, steel, aluminum, niobium-tin, niobium-titanium and niobium-zirconium alloys and the like. Referring to FIG. 1 of the drawing, there is illustrated a conductor 10 comprising a niobium-zirconium alloy conductor 11 coated with a hard, tough, solid copolymeric resinous film 12 applied to and cured on the conductor as described hereinafter. It will be understood that the coating may be applied by any suitable means such, for example, as by dipping, die-coating, or the like. After curing, it will be found that the resinous film 12 is tenaciously adhered to the conductor 11. While the conductor 11 is illustrated as being of circular shape, it will be understood that it may be of any other desirable shape, such as square, rectangular or flat strip, or it may be composed of twisted or braided wire or the like. The insulating coating 12 may have disposed therein suitable fillers, such as finely divided mica, silica and iron oxide. Coloring materials or the like may also be disposed in the composition.

The coating compositions of this invention may be applied to electrical conductors such as wire, in combination with coatings of both organic and inorganic fibrous materials. One form of this modification of the invention is illustrated in FIG. 2 of the drawing showing an electrical conductor 20 of copper, for example, carrying a layer 21 of fibrous material which may be glass fibers, asbestos fibers, paper, cotton or silk or the like, either wrapped or braided or woven or various combinations thereof. The fibrous layer 21 ordinarily will be applied to the conductor 20 and the resinous liquid compositions of this invention applied over the fibrous layer by dipping, die-coating or the like until the fibrous material is saturated and the coatings are then baked to cure the resin. It will be appreciated that the copper conductor may be pretreated with an adhesive composition in order to adhere the layer 31 thereto. Such adhesive compositions may comprise an initial tacky coating of the composition of this invention or other resinous compositions.

The following examples are illustrative of the preparation of the coating compositions, application of the compositions to electrical conductors and the insulated conductors according to this invention.

*Example I*

Modified epoxy component: Grams
   Epoxy resin (Epon 1007, Shell Chemical Co.)
     (Epoxy equivalent=1800) _____ 1500
   M-phenylenediamine _____ 90

The epoxy resin was dissolved in 2250 grams of "Cellosolve" acetate in a three-neck flask containing a stirrer, thermometer, nitrogen gas inlet tube, and reflux condenser. The m-phenylenediamine was added and the solution was refluxed for two hours with nitrogen sparging. The resulting solution was then diluted with 169 grams of "Cellosolve" acetate.

Polyisocyanate component: Grams
   Trimethylolpropane tolylene diisocyanate adduct
     blocked with phenol _____ 680

The foregoing amount of diisocyanate adduct was dissolved in 680 grams of m-, p-cresol and blended with the modified epoxy component to provide a two-component coating composition. This solution was then diluted to dip-coating viscosity with three volumes of xylene to one volume of cresylic acid and coated on #17 A.W.G. wire. Comparing the coated wire of this invention with a typical urea-formaldehyde modified epoxy coated wire disclosed that the coating of this invention has improved abrasion resistance, improved retention of abrasion resistance after immersion in polyhalogenated alkane refrigerants and much better solderability. The coated wire of this invention performed satisfactorily in automatic winding machines. Baking requirements for the coating compositions of this invention are so low that the compositions can be coated satisfactorily at low temperatures on niobium-zirconium superconducting wires so that the insulated wire retains its desired superconducting properties. The insulation can be repeatedly cycled down to liquid helium temperatures without cracking or flaking. A sample of a #17 A.W.G. wire baked at 22 ft. per minute in a 15-foot vertical oven at 430° C. was elongated 25% and placed in a sealed tube with air and water. The sealed tube and wire were heated to 120° C. and maintained at that temperature for 45 days. At the end of that period, an examination of the sample disclosed that the enamel coating remained intact and was visibly unaffected, indicating outstanding hydrolytic stability.

*Example II*

Modified epoxy component.—The preparation and quantities of the modified epoxy components in this example were identical to that of Example I, described hereinabove.

Polyisocyanate component: Grams
   Trimethylolpropane tolylene diisocyanate adduct blocked with phenol _____ 1,060

The diisocyanate adduct was dissolved in 1060 grams of m-, p-cresol. The two components were blended together and the solution was diluted to dip-coating viscosity with a solvent made of three volumes of xylene to one volume of cresylic acid. This composition was coated on #17 A.W.G. wire. Tests on these samples showed a higher abrasion resistance and slightly lower flexibility than the samples prepared according to the procedure outlined in Example I.

*Example III*

Modified epoxy component.—The preparation and quantities of the modified epoxy component in this example were identical to that of Example I, described hereinabove.

Polyisocyanate component: Grams
   Trimethylolpropane tolylene diisocyanate adduct
     blocked with phenol _____ 530

The diisocyanate adduct was dissolved in 530 grams of m-, p-cresol and blended with the modified epoxy component. This solution was diluted to dip-coating viscosity with a solvent of three volumes of xylene to one volume of cresylic acid and coated on #17 A.W.G. wire. Tests conducted on these samples disclosed a marked improvement in flexibility and heat shock accompanied by some decrease in abrasion resistance as compared to samples prepared in Examples I and II. A fair resistance to softening in polyhalogenated alkane refrigerants was noted.

*Example IV*

Modified epoxy component.—The preparation and quantities of the modified epoxy component in this example were identical to that of Example I, described hereinabove.

Polyisocyanate component: Grams
   Tolylene diisocyanate (80% 2,4- and 20%
     2,6-tolylene diisocyanate) _____ 870.4
   Trimethylolpropane _____ 24
   m-, p-Cresol _____ 1500

The described tolylene diisocyanate was dissolved in the 1500 grams of m-, p-cresol and heated at 110° C. for one hour in a reaction flask with stirrer and nitrogen sparging. The trimethylolpropane was added and the reaction was continued at 130 to 140° C. for one hour. The solvent consisting of 434 grams of m-, p-cresol and 234 grams of xylene was added. Thirteen hundred and sixty grams of the described polyisocyanate solution were blended with the modified epoxy component and the blend was diluted to dip-coating viscosity. Tests on these samples disclosed a very good abrasion resistance and excellent resistance to polyhalogenated alkane refrigerants.

*Example V*

Modified epoxy component.—The preparation and quantities of the modified epoxy component in this example were identical to that of Example I, described hereinabove.

Polyisocyanate component.—The polyisocyanate component in this example was identical to that described in Example I except that only 168 grams of the diisocyanate adduct were dissolved in 168 grams of m-, p-cresol.

Coumarone-indene component: Grams
   Phenol-modified coumarone-indene resin (Nevillac 10°, the Neville Co.) _____ 240

Only a portion of the modified epoxy component prepared in this example was employed in the blend. 994 grams of the modified epoxy component solution were added to the phenol-modified coumarone-indene resin and the 168 grams of diisocyanate adduct. The blend was thinned to coating viscosity with a solvent of cresol and xylene mixed together on a 3 to 1 volumetric basis. Tests on these samples disclosed that the coating had satisfactory flexibility, abrasion resistance and heat shock. The sample also showed good resistance to softening in polyhalogenated alkane refrigerants.

*Example VI*

*Modified epoxy component.*—The preparation of the modified epoxy component in this example was identical to that of Example I, described hereinabove. However, only 692 grams of the modified epoxy component solution was employed in the three-component blend described below.

| Polyisocyanate component: | Grams |
|---|---|
| Trimethylolpropane tolylene diisocyanate adduct blocked with phenol | 117 |

The diisocyanate adduct was dissolved in 117 grams of m-, p-cresol and employed in the blend as outlined hereinbelow.

| Polyurethane component: | Grams |
|---|---|
| Tolylene diisocyanate | 226 |
| 1,4-butanediol | 117 |

The tolylene diisocyanate and 281 grams of m-, p-cresol were charged into a three-neck reaction flask containing a stirrer, thermometer, nitrogen gas inlet tube and reflux condenser. The solution was heated for one hour at 120° C. The solution was then cooled to 100° C. and the 1,4-butanediol was added slowly at that temperature. The solution was heated from 100° C. to 200° C. at a rate of about 20° C. per hour. At 200° C., 206 grams of cresol were added. The solution was cooled and the solids content was determined to be 45.3%, by weight. 463 grams of the polyurethane component solution were blended with the modified epoxy component and the polyisocyanate solution. This three-component composition was thinned to dip-coating viscosity and coated on No. 17 A.W.G. wire. Tests conducted on samples of this wire showed that the coating had slightly lower flexibility than the composition of Example I, but had excellent abrasion resistance and outstanding resistance to softening in polyhalogenated alkane refrigerants.

*Example VII*

| Modified epoxy component: | Grams |
|---|---|
| Epoxy resin (Epon 1007 Shell Chemical Company) | 500 |
| Monoethanolamine | 17.0 |

Together with 750 grams of Cellosolve acetate the epoxy resin and monoethanolamine were charged into a three-neck flask equipped with a stirrer, thermometer, nitrogen gas inlet tube and reflux condenser. The solution was refluxed for two hours. At this point, 57 grams of Cellosolve acetate were added.

| Polyisocyanate component: | Grams |
|---|---|
| Trimethylolpropane tolylene diisocyanate adduct blocked with phenol | 216 |

The diisocyanate adduct was dissolved in a solvent consisting of 108 grams of cresylic acid and 108 grams of xylene. This polyisocyanate component was blended with the modified epoxy component and thinned to dip-coating viscosity with a solvent made from three volumes of xylene to one volume of cresylic acid. This coating composition was employed to coat #17 A.W.G. wire. The coating so produced showed excellent flexibility, fair abrasion resistance and fair retention of abrasion resistance when immersed in polyhalogenated alkane refrigerants.

*Example VIII*

*Modified epoxy component.*—The preparation and quantities of the modified epoxy component solution in this example were identical to that described in Example VII.

*Polyisocyanate component.*—The preparation and quantities of the polyisocyanate component solution in this example were identical to that described in Example VII.

*Urea-formaldehyde component.*—This component consisted of 357 grams of butylated urea-formaldehyde resin (Beetle 227-8, American Cyanamid Company) dissolved in 357 grams of a butanol-xylol solvent. This urea-formaldehyde component was blended with the modified epoxy component in the polyisocyanate component and thinned with a solvent of three volumes of xylene and one volume of cresylic acid to dip-coating viscosity. This three component coating composition was employed to insulate No. 17 A.W.G. wire. Tests conducted on these wires disclosed the coatings to have excellent flexibility, moderate resistance to abrasion and satisfactory heat shock properties.

*Example IX*

*Modified epoxy component.*—The modified epoxy component in this example consisted of 536.0 grams of the modified epoxy component solution of Example VII.

*Polyisocyanate component.*—The polyisocyanate component of this example consisted of 360 grams of the polyisocyanate component solution of Example IV.

| Polyester component: | Grams |
|---|---|
| Isophthalic acid | 332.2 |
| Ethylene glycol | 93.1 |
| Trimethylolethane | 120.1 |
| Isopropyl titanate | 3.0 |
| m-, p-Cresol | 20.6 |

The foregoing ingredients were charged into a three-neck reaction flask equipped with a stirrer, thermometer, gas inlet tube and steam condenser. The reactants were first heated with nitrogen sparging to 180° C., then to 263° C. at a rate of about 15° C. per hour. At this point the resinous product reached a thread-forming stage. 104 grams of m-, p-cresol were added and the reaction was continued for four hours at 229° C. when another thread-forming stage was reached. Another 104 grams of m-, p-cresol was added and the reaction was continued at 222° C. for two and a half hours to another thread-forming stage. This final reaction product was diluted with 300 grams of cresylic acid and 300 grams of xylene. The solids content of this solution was determined to be 40.2%, by weight. 523 grams of the polyester component solution was blended with the epoxy component solution and the polyisocyanate component solution. This three-component blend was further thinned to dip-coating viscosity with a solvent consisting of three volumes of xylol to one volume of cresylic acid. A No. 17 A.W.G. wire was coated as in the prior examples. Tests on these wire samples showed the coating to have excellent resistance to softening by polyhalogenated alkane refrigerants and outstanding thermal stability for a modified epoxy resin. The thermal life of this coating at 150° C., 175° C., 200° C. and 225° C. was more than twice that of urea-formaldehyde modified epoxy enamel coatings heretofore known.

*Example X*

| Modified epoxy component: | Grams |
|---|---|
| Epoxy resin (Epon 1007, Shell Chemical Co.) | 1110 |
| m-Phenylenediamine | 16.7 |

The epoxy resin was dissolved in 1665 grams of Cellosolve acetate and refluxed with the m-phenylenediamine for two hours. The product was diluted with 125 grams of Cellosolve acetate. The solids content of the solution was determined to be 38.7%, by weight. Only 904 grams of this modified epoxy component solution was employed in the blend described below.

*Polyisocyanate component.*—The polyisocyanate component of this example consisted of a solution of 210 grams of trimethylolpropane tolylene diisocyanate adduct blocked with phenol dissolved in 210 grams of cresylic acid.

*Urea-formaldehyde component.*—The urea-formaldehyde component in this example consisted of 280 grams of a 50%, by weight, on a solid basis, solution of butylated urea-formaldehyde resin dissolved in a butanol-xylol solvent. The three component solutions were blended together and thinned with a solvent of three volumes of xylene and one volume of cresylic acid to coating viscosity and dip-coated on No. 17 AWG wire. The blended three-component coating solution had a good baking range and produced coatings having satisfactory properties. The coatings showed an excellent retention of abrasion resistance after exposure to polyhalogenated alkane refrigerants.

*Example XI*

*Modified epoxy component.*—In this example, the modified epoxy component consisted of 923 grams of the modified epoxy component solution prepared as described in Example I.

*Polyisocyanate component.*—The polyisocyanate component in this example consisted of 155.8 grams of trimethylolpropane tolylene diisocyanate adduct blocked with phenol dissolved in 355.8 grams of cresylic acid.

Polyesteramide component: | Grams
---|---
Isophthalic acid | 646.4
Glycerol | 222.6
Ethylene glycol | 94.4
Urea | 24.0
Zinc naphthenate (14.5% of zinc, by weight) | 61.2

All of the glycerol, ethylene glycol, 580.0 grams of of isophthalic acid and 41.4 grams of m-, p-cresol were charged into a three-neck reaction flask having a stirrer, thermometer, gas inlet tube and steam condenser. These ingredients were first heated to 190° C., then to 245° C. at a rate of about 15° C. per hour. At 245° C., the resinous product became thread-forming and 208 grams of m-, p-cresol, all of the urea and the remaining 66.4 grams of the isophthalic acid were added. The reaction was continued at a temperature of about 200° C. to 225° C. until a second thread-forming stage was reached. At this point, another 208 grams of m-, p-cresol was added and the reaction was continued at 216° C. to a third thread-forming stage. At this point, 416 grams of cresylic acid and all of the zinc naphthenate were added. The reaction was continued for five minutes at 200° C. The solution was diluted with 624 grams of cresylic acid and 850 grams of solvesso 100. 882 grams of this polyesteramide solution was blended with the modified epoxy component solution and the polyisocyanate component solution to form a three-component coating composition. This three-component coating composition was employed to coat No. 17 AWG wire. Tests conducted on these wire samples showed that the abrasilon resistance was satisfactory and that the coating exhibited heat shock properties.

*Example XII*

*Modified epoxy component.*—The preparation and quantities of the modified epoxy component solution in this example were identical to that of Example VII.

*Polyisocyanate component.*—The polyisocyanate component of this example consisted of 334.0 grams of the polyisocyanate component solution prepared in Example IV.

*Urea-formaldehyde component.*—The urea-formaldehyde component in this example consisted of 334.0 grams of a 50%, by weight, on a solid basis, solution of butylated urea-formaldehyde resin dissolved in a butanol-xylol solvent. The three described components were blended together and coated on No. 17 AWG wire. Tests on these wires showed that the coating had good abrasion resistance and heat shock properties. Retention of abrasion resistance after exposure to polyhalogenated alkane refrigerants was excellent.

Table I, which appears hereinbelow is a summary of the baking range, flexibility, abrasion resistance and heat shock properties of the compositions and coatings described in the foregoing examples. The baking range is the range of speeds which produce good properties in a fifteen foot enameling tower or oven having a maximum temperature of 430° C.

Flexibility is determined by elongating the wire and wrapping the elongated wire about its own diameter. At the reported elongation, no evidence of cracking or crazing was observed. The abrasion resistance data reports the number of strokes necessary to penetrate the enamel coating on the wire test samples using a 740 gram load on a 16 mil diameter knife edge. In the heat shock test, a wire sample is wound about its own diameter and heated in an air circulating oven for one hour at various temperatures, in 25° C. increments. At the reported temperatures, no cracking of the enamel coating was visible to the naked eye.

TABLE I.—PROPERTY SUMMARY OF MODIFIED EPOXY WIRE ENAMELS ON NO. 17 AWG WIRE

| Example No. | Baking Range, Feet Per Minute | Flexibility, Percent Elongation | Abrasion Resistance, No. of Strokes | Heat Shock, Temperature, Degrees C. |
|---|---|---|---|---|
| I | 22–50 | 25–30 | 35–48 | 150–175 |
| II | 22–45 | 15–30 | 24–81 | 150–175 |
| III | 22–45 | 30 | 23–30 | 200 |
| IV | 19–40 | 15–25 | 20–124 | 150 |
| V | 22–36 | 20–30 | 36–63 | 150 |
| VI | 17–28 | 0–10 | 32–102 | 150 |
| VII | 22–36 | 30 | 18–56 | 150 |
| VIII | 15–40 | 15–25 | 15–47 | 175 |
| IX | 15–28 | 5–20 | 18–36 | 125 |
| X | 12–40 | 10–25 | 19–67 | 150 |
| XI | 17–36 | 10–30 | 18–44 | 175–200 |
| XII | 15–36 | 10–20 | 25–43 | 175 |

Table II, which appears hereinbelow, is a summary of the abrasion resistance of the enameled wires described in the foregoing examples both before and after exposure to liquid monochlorodifluoromethane in a sealed bomb. The number of strokes necessary to penetrate the coating using a 450 gram load on a 16 mil knife edge is reported for samples in air and then in the refrigerant after 24 and 72 hours of exposure.

TABLE II.—ABRASION RESISTANCE OF SAMPLES IN AIR AND AFTER IMMERSION IN REFRIGERANT AT ROOM TEMPERATURE

| Example No. | Abrasion Resistance, Number of Strokes | | |
|---|---|---|---|
| | Original In Air | 24 Hours | 72 Hours |
| I | 506 | 131 | 46 |
| III | 65 | 109 | 56 |
| IV | 383 | 215 | 151 |
| V | 360 | 148 | 93 |
| VI | 504 | 489 | 499 |
| VII | 235 | 83 | 29 |
| VIII | 270 | 149 | 78 |
| IX | 638 | 398 | 212 |
| X | 166 | 240 | 218 |
| XI | 608 | 174 | 52 |
| XII | 380 | 319 | 359 |

Since certain obvious changes may be made in the above procedure and different embodiments of the invention could be made without departing from the scope thereof, it is intended that all matter contained therein in the above description and drawings shall be taken in connection with the accompanying claims and not in a limiting sense.

I claim as my invention:

1. A liquid resinous coating composition comprising an admixture of at least about 35%, on a solids weight basis, of (A) a resinous blend of about 40 to 90%, by weight, of (1) a modified epoxy resin derived from the reaction of (a) an aromatic base diglycidyl ether having an epoxy equivalent from 400 to 4000 and (b) an organic amino compound selected from the group consisting of aromatic polyamines and alkanol amines in proportions to provide from one-half to two epoxy groups for each amino group and about 10% to 60%, by weight, of (2) a blcoked polyisocyanate having the general formula

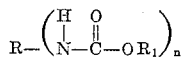

wherein R is a polyvalent organic radical, $R_1$ is a phenyl group or a derivative thereof containing methyl substituents and $n$ is an integer of three or more; up to about 30%, by weight, of (B) a urea-formaldehyde resin; up to about 65%, by weight, of (C) a polyester resin selected from the group consisting of isophthalate and terephthalate polyesters; up to about 65%, by weight, of (D) a polyester amide resin; up to about 40%, by weight, of (E) a phenol-modified coumaroneindene resin; and up to about 35%, by weight, of (F) a polyurethane resin.

2. A liquid coating composition comprising a resinous blend of about 40 to 90%, by weight, of (A) a modified epoxy resin derived from the reaction of (1) an aromatic base diglycidyl ether having an epoxy equivalent from 400 to 4000 and (2) an organic amino compound selected from the group consisting of aromatic polyamines and alkanol amines, in proportions to provide from one-half to two epoxy groups for each amino group and about 10 to 60%, by weight, of (B) a blocked polyisocyanate resin having the general formula

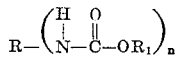

wherein R is a polyvalent organic radical, $R_1$ is a phenyl group or a derivative thereof containing methyl substituents and $n$ is an integer of three or more.

3. A liquid resinous coating composition comprising an admixture of at least about 70%, on a solids weight basis, of (A) a resinous blend of about 40 to 90%, by weight, of (1) a modified epoxy resin derived from the reaction of (a) an aromatic base diglycidyl ether having an epoxy equivalent from 400 to 4000 and (b) an organic amino compound selected from the group consisting of aromatic polyamines and alkanol amines in proportions to provide from one-half to two epoxy groups for each amino group and about 10% to 60%, by weight, of (2) a blocked polyisocyanate having the general formula

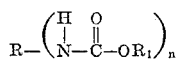

wherein R is a polyvalent organic radical, $R_1$ is a phenyl group for a derivative thereof containing methyl substituents and $n$ is an integer of three or more and up to about 30%, by weight, of (B) a urea-formaldehyde resin.

4. A resinous coating composition comprising an admixture of at least about 35%, on a solids weight basis, of (A) a resinous blend of about 40 to 90%, by weight, of (1) a modified epoxy resin derived from the reaction of (a) an aromatic base diglycidyl ether having an epoxy equivalent from 400 to 4000 and (b) an organic amino compound selected from the group consisting of aromatic polyamines and alkanol amines in proportions to provide from one-half to two epoxy groups for each amino group and about 10% to 60%, by weight, of (2) a blocked polyisocyanate having the general formula

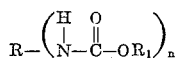

wherein R is a polyvalent organic radical, $R_1$ is a phenyl group or a derivative thereof containing methyl substituents and $n$ is an integer of three or more and up to about 65%, by weight, of (B) a polyester resin selected from the group consisting of isophthalate and terephthalate polyesters.

5. A liquid resinous coating composition comprising an admixture of at least about 35%, on a solids weight basis, of (A) a resinous blend of about 40 to 90%, by weight, of (1) a modified epoxy resin derived from the reaction of (a) an aromatic base diglycidyl ether having an epoxy equivalent from 400 to 4000 and (b) an organic amino compound selected from the group consisting of aromatic polyamines and alkanol amines in proportions to provide from one-half to two epoxy groups for each amino group and about 10% to 60%, by weight, of (2) a blocked polyisocyanate having the general formula

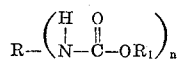

wherein R is a polyvalent organic radical, $R_1$ is a phenyl group or a derivative thereof containing methyl substituents and $n$ is an integer of three or more and up to about 65%, by weight, of (B) a polyester amide resin.

6. A liquid resinous coating composition comprising an admixture of at least about 60%, on a solids weight basis, of (A) a resinous blend of about 40 to 90%, by weight, of (1) a modified epoxy resin derived from the reaction of (a) an aromatic base diglycidyl ether having an epoxy equivalent from 400 to 4000 and (b) an organic amino compound selected from the group consisting of aromatic polyamines and alkanol amines in proportions to provide from one-half to two epoxy groups for each amino group and about 10 to 60%, by weight, of (2) a blocked polyisocyanate having the general formula

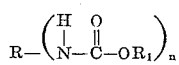

wherein R is a polyvalent organic radical, $R_1$ is a phenyl group or a derivative thereof containing methyl substituents and $n$ is an integer of three or more and up to about 40%, by weight, of (B) a phenol-modified coumarone indene resin..

7. A liquid resinous coating composition comprising an admixture of at least about 65%, on a solids weight basis, of (A) a resinous blend of about 40 to 90%, by weight, of (1) a modified epoxy resin derived from the reaction of (a) an aromatic base diglycidyl ether having an epoxy equivalent from 400 to 4000 and (b) an organic amino compound selected from the group consisting of aromatic polyamines and alkanol amines in proportions to provide from one-half to two epoxy groups for each amino group and about 10 to 60%, by weight, of (2) a blocked polyisocyanate having the general formula

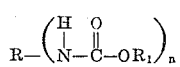

wherein R is a polyvalent organic radical, $R_1$ is a phenyl group or a derivative thereof containing methyl substituents and $n$ is an integer of three or more and up to about 35%, by weight, of (B) a polyurethane resin.

8. An insulated electrical conductor comprising, in combination, an electrical conductor and a cured adherent film of a solidified resinous copolymer deposited on said conductor, the copolymer comprising the heat reaction product of a resinous blend of about 40 to 90%, by weight, of (A) a modified epoxy resin derived from the reaction of (1) an aromatic base diglycidyl ether having an epoxy equivalent from 400 to 4000 and (2) an organic amino compound selected from the group consisting of aromatic polyamines and alkanol amines, in proportions to provide from one-half to two epoxy groups for each amino group and about 10% to 60%, by weight, of (B) a blocked polyisocyanate resin having the general formula

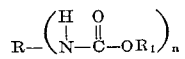

wherein R is a polyvalent organic radical, $R_1$ is a phenyl group or a derivative thereof containing methyl substituents and $n$ is an integer or three or more.

9. An insulated electrical conductor comprising, in combination, an electrical conductor and a cured adherent film of a solidified resinous copolymer deposited on said conductor, the copolymer comprising the heat reaction product of an admixture of at least about 70%, on a solids weight basis, of (A) a resinous blend of about 40 to 90%, by weight, of (1) a modified epoxy resin derived from the reaction of (a) an aromatic base diglycidyl ether having an epoxy equivalent from 400 to 4000 and (b) an organic amino compound selected from the group consisting of aromatic polyamines and alkanol amines in proportions to provide from one-half to two epoxy groups for each amino group and about 10% to 60%, by weight of (2) a blocked polyisocyanate having the general formula

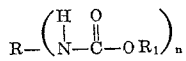

wherein R is a polyvalent organic radical, $R_1$ is a phenyl group for a derivative thereof containing methyl substituents and $n$ is an integer of three or more and up to about 30%, by weight, of (B) a urea-formaldehyde resin.

10. An insulated electrical member comprising, in combination, an electrical conductor and a cured adherent film of a solidified resinous copolymer deposited on said conductor, the copolymer comprising the heat reaction product of an admixture of at least about 35%, on a solids weight basis, of (A) a resinous blend of about 40 to 90%, by weight, of (1) a modified epoxy resin derived from the reaction of (a) an aromatic base diglycidyl ether having an epoxy equivalent from 400 to 4000 and (b) an organic amino compound selected from the group consisting of aromatic polyamines and alkanol amines in proportions to provide from one-half to two epoxy groups for each amino group and about 10% to 60%, by weight, of (2) a blocked polyisocyanate having the general formula

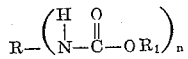

wherein R is a polyvalent organic radical, $R_1$ is a phenyl group or a derivative thereof containing methyl substituents and $n$ is an integer of three or more and up to about 65%, by weight, of (B) a polyester resin selected from the group consisting of isophthalate and terephthalate polyesters.

11. An insulated electrical member comprising, in combination, an electrical conductor and a cured adherent film of a solidified resinous copolymer deposited on said conductor, the copolymer comprising the heat reaction product of an admixture of at least about 35%, on a solids weight basis, of (A) a resinous blend of about 40 to 90%, by weight, of (1) a modified epoxy resin derived from the reaction of (a) an aromatic base diglycidyl ether having an epoxy equivalent from 400 to 4000 and (b) an organic amino compound selected from the group consisting of aromatic polyamines and alkanol amines in proportions to provide from one-half to two epoxy groups for each amino group and about 10% to 60%, by weight, of (2) a blocked polyisocyanate having the general formula

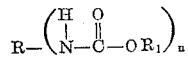

wherein R is a polyvalent organic radical, $R_1$ is a phenyl group or a derivative thereof containing methyl substituents and $n$ is an integer of three or more and up to about 65%, by weight, of (B) a polyester amide resin.

12. An insulated electrical member comprising, in combination, an electrical conductor and a cured adherent film of a solidified resinous copolymer deposited on said conductor, the copolymer comprising the heat reaction product of an admixture of at least about 60%, on a solids weight basis, of (A) a resinous blend of about 40 to 90%, by weight, of (1) a modified epoxy resin derived from the reaction of (a) an aromatic base diglycidyl ether having an epoxy equivalent from 400 to 4000 and (b) an organic amino compound selected from the group consisting of aromatic polyamines and alkanol amines in proportions to provide from one-half to two epoxy groups for each amino group and about 10 to 60%, by weight, of (2) a blocked polyisocyanate having the general formula

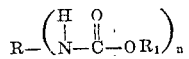

wherein R is a polyvalent organic radical, $R_1$ is a phenyl group or a derivative thereof containing methyl substituents and $n$ is an integer of three or more and up to about 40%, by weight, of (B) a phenol modified coumarone indene resin.

13. An insulated electrical member comprising, in combination, an electrical conductor and a cured adherent film of a solidified resinous copolymer deposited on said conductor, the copolymer comprising the heat reaction product of an admixture of at least about 65%, on a solids weight basis, of (A) a resinous blend of about 40 to 90%, by weight, of (1) a modified epoxy resin derived from the reaction of (a) an aromatic base digclycidyl ether having an epoxy equivalent from 400 to 4000 and (b) an organic amino compound selected from the group consisting of aromatic polyamines and alkanol amines in proportions to provide from one-half to two epoxy groups for each amino group and about 10 to 60%, by weight, of (2) a blocked polyisocyanate having the general formula

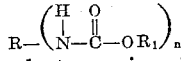

wherein R is a polyvalent organic radical, $R_1$ is a phenyl group or a derivative thereof containing methyl substituents and $n$ is an integer of three or more and up to about 35%, by weight, of (B) a polyurethane resin.

14. An insulated electrical member comprising, in combination, an electrical conductor and a cured adherent film of a solidified resinous copolymer deposited on said conductor, the copolymer comprising the heat reaction product of an admixture of at least about 35%, on a solids weight basis, of (A) a resinous blend of about 40 to 90%, by weight, of (1) a modified epoxy resin derived from the reaction of (a) an aromatic base diglycidyl ether having an epoxy equivalent from 400 to 4000 and (b) an organic amino compound selected from the group consisting of aromatic polyamines and alkanol amines in proportions to provide from one-half to two epoxy groups for each amino group and about 10% to 60%, by weight, of (2) a blocked polyisocyanate having the general formula

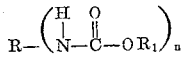

wherein R is a polyvalent organic radical, $R_1$ is a polyvalent organic radical, $R_1$ is a phenyl group or a derivative thereof containing methyl substituents and $n$ is an integer of three or more; up to about 30%, by weight, of (B) a urea-formaldehyde resin; up to about 65%, by weight, of (C) a polyester resin selected from the group consisting of isophthalate and terephthalate polyesters; up to about 65%, by weight, of (D) a polyester amide resin; up to about 40%, by weight, of (E) a phenol-modified coumarone-indene resin; and up to about 35%, by weight, of (F) a polyurethane resin.

15. A liquid coating composition comprising a resinous blend of about 40 to 90%, by weight, of (A) a modified epoxy resin derived from the reaction of (1) an aromatic base diglycidyl ether having an epoxy equivalent from 400 to 4000 and (2) an organic aromatic polyamine in a proportion to provide from one-half to two epoxy groups for each amino group and about 10 to 60%, by weight, of (B) a blocked polyisocyanate resin having the general formula $$R\text{---}\left(\underset{\underset{\text{N}}{|}}{\overset{\overset{\text{H}}{|}}{}}\text{---}\underset{}{\overset{\overset{\text{O}}{\|}}{\text{C}}}\text{---}OR_1\right)_n$$

wherein R is a polyvalent organic radical, $R_1$ is a phenyl group or a derivative thereof containing methyl substituents and $n$ is an integer of three or more.

16. A liquid coating composition comprising a resinous blend of about 40 to 90%, by weight, of (A) a modified epoxy resin derived from the reaction of (1) an aromatic base diglycidyl ether having an epoxy equivalent from 400 to 4000 and (2) an alkanolamine, in a proportion to provide from one-half to two epoxy groups for each amino group and about 10 to 60%, by weight, of (B) a blocked polyisocyanate resin having the general formula $$R\text{---}\left(\underset{\underset{\text{N}}{|}}{\overset{\overset{\text{H}}{|}}{}}\text{---}\underset{}{\overset{\overset{\text{O}}{\|}}{\text{C}}}\text{---}OR_1\right)_n$$

wherein R is a polyvalent organic radical, $R_1$ is a phenyl group or a derivative thereof containing methyl substituents and $n$ is an integer of three or more.

17. A liquid coating composition comprising a resinous blend of about 40 to 90%, by weight, of (A) a modified epoxy resin and derived from the reaction of (1) an aromatic base diglycidyl ether having an epoxy equivalent from 400 to 4000 and (2) metaphenylenediamine amines in a proportion to provide from one-half to two epoxy groups for each amino group and about 10 to 60%, by weight, of (B) a blocked polyisocyanate resin having the general formula $$R\text{---}\left(\underset{\underset{\text{N}}{|}}{\overset{\overset{\text{H}}{|}}{}}\text{---}\underset{}{\overset{\overset{\text{O}}{\|}}{\text{C}}}\text{---}OR_1\right)_n$$

wherein R is a polyvalent organic radical, $R_1$ is a phenyl group or a derivative thereof containing methyl substituents and $n$ is an integer of three or more.

18. A liquid coating composition comprising a resinous blend of about 40 to 90%, by weight, of (A) a modified epoxy resin derived from the reaction of (1) an aromatic base diglycidyl ether having an epoxy equivalent from 400 to 4000 and (2) monoethanolamine in a proportion to provide from one-half to two epoxy groups for each amino group and about 10 to 60%, by weight, of (B) a blocked polyisocyanate resin having the general formula $$R\text{---}\left(\underset{\underset{\text{N}}{|}}{\overset{\overset{\text{H}}{|}}{}}\text{---}\underset{}{\overset{\overset{\text{O}}{\|}}{\text{C}}}\text{---}OR_1\right)_n$$

wherein R is a polyvalent organic radical, $R_1$ is a phenyl group or a derivative thereof containing methyl substituents and $n$ is an integer of three or more.

References Cited by the Examiner

UNITED STATES PATENTS 3,238,273    3/1966    Hampson _____ 260—830

FOREIGN PATENTS 763,347    10/1954    Great Britain.

OTHER REFERENCES

Lee et al.: Epoxy resins, 1957, pages 159–160.

MURRAY TILLMAN, *Primary Examiner.*

S. H. BLECH, P. LIEBERMAN, *Assistant Examiners.*